United States Patent [19]

Undén

[11] 4,437,425
[45] Mar. 20, 1984

[54] AIR FLOW DIRECTION INDICATOR

[76] Inventor: Nils H. Undén, Essingekroken 8, S-11265 Stockholm, Sweden

[21] Appl. No.: 328,642

[22] Filed: Dec. 8, 1981

[30] Foreign Application Priority Data

Dec. 16, 1980 [SE] Sweden ............................. 8008835

[51] Int. Cl.³ .............................................. B63H 9/04
[52] U.S. Cl. ...................................... 114/102; 73/188; 116/26; 116/265
[58] Field of Search ................ 114/102, 103, 39, 91, 114/144 C; 73/188; 116/28 R, 264, 265, 273, 274, 26

[56] References Cited

U.S. PATENT DOCUMENTS

| 2,681,568 | 6/1954 | Cloud. |
| 3,487,800 | 1/1970 | Schweitzer et al. ............... 114/91 X |
| 3,845,734 | 11/1974 | Demos. |
| 3,906,881 | 9/1975 | von Trepka .................... 114/144 C |
| 4,080,826 | 3/1978 | Perretta. |
| 4,283,943 | 8/1981 | Schoneberger, Jr. .............. 114/102 |

FOREIGN PATENT DOCUMENTS 32573  7/1981  European Pat. Off. ............ 73/188

Primary Examiner—Sherman D. Basinger
Attorney, Agent, or Firm—Young & Thompson

[57] ABSTRACT

An airflow direction indicator in accordance with the invention is intended for sailboards, in which the front portion of the sail includes a tunnel which is slipped onto the mast and is rotatable relative thereto when varying the sheeting and curvature of the sail. In accordance with the invention, the indicator is supported by a fitting to be attached to the forward portion of the tunnel, this fitting carrying a mounting shaft forming an acute angle to the longitudinal direction of the tunnel and mast, and carrying a wind vane which is biased to return to a substantially vertical position adjacent the tunnel with the main longitudinal direction of the vane substantially parallel with the longitudinal direction of the fitting and tunnel, respectively, when the fitting is held in a vertical position, whereby the vane will indicate changes in the direction of the flow of air around the forward edge of the sail.

5 Claims, 16 Drawing Figures

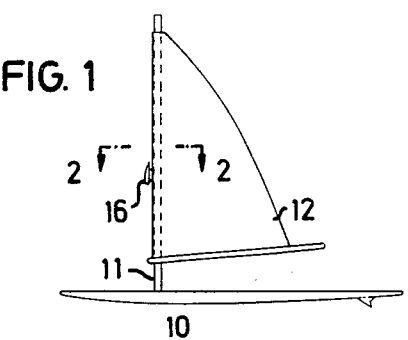
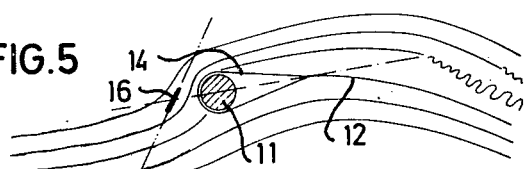
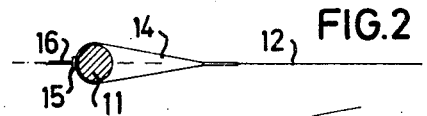
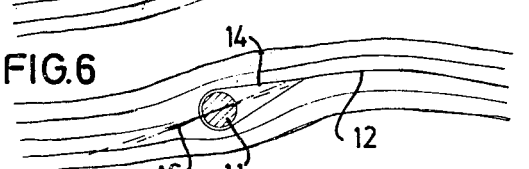
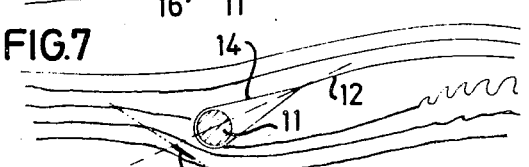
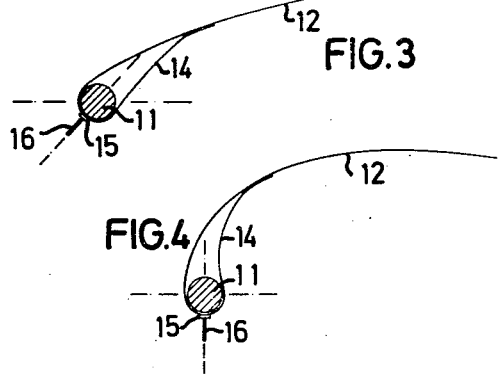
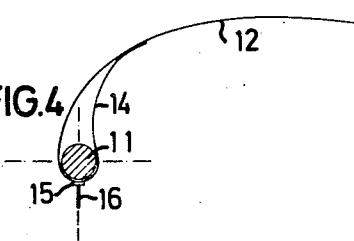
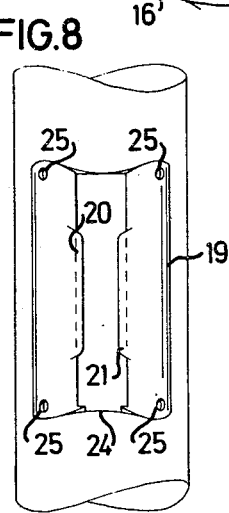
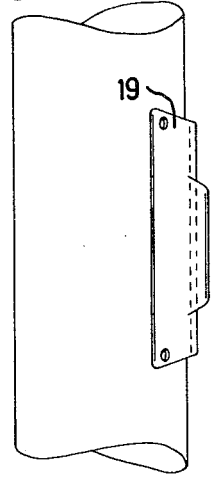
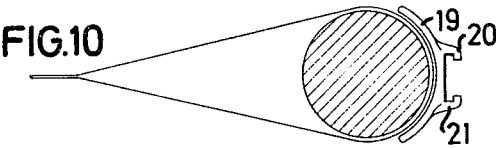

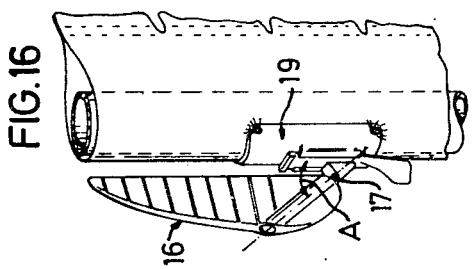
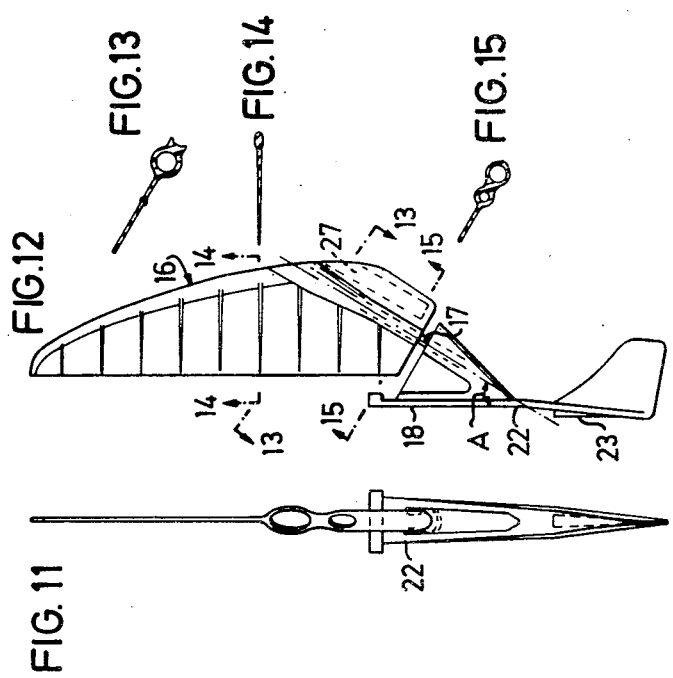

AIR FLOW DIRECTION INDICATOR

The present invention relates to an airflow direction indicator for such sailboards having a mast mounted to be tiltable in all directions relative to the sailboard and provided with a sail having its front edge formed to a tunnel or stocking-like section which is slipped onto the mast and is turnable relative thereto to suit the sail stressing or sail curvature.

In respect of sailing boats it is known to place a wind vane at the top of the mast, to swing about an axis substantially parallel to the mast to indicate the relative wind direction. Although such a known wind indicator is a helpful instrument at sail boats, it would be inconvenient to place it in the top of a mast of a sailboard under consideration. Examples of known wind indicators for sailboats are shown for example in U.S. Pat. Nos. 2,681,568, 3,845,734 and 4,080,826.

The object of the present invention is therefore to provide a simple and effective airflow direction indicator suitable for use with sailboards so as to indicate in a simple manner when the sail has the best possible angle and curvature to the wind and the airflow, respectively, around the mast for achieving effective propulsion, and also to indicate when the sail departs from this optimum attitude. This object is achieved with an airflow indicator which has, in accordance with the invention, the characterizing features disclosed in the accompanying claims.

To obtain the best possible airflow at the forward edge of the sail with respect to sailboards, the sail should be connected to the mast with the aid of a tunnel or stocking-like section sewn at the forward edge of the sail and which is slipped over the mast. This tunnel can turn about the mast. If the sail is stretched backwards in the central plane of the sailboard, the forward portion of the tunnel will be facing forwards in the longitudinal direction of the sailboard. When the sail is swung out on either side and sheeted in a given position, the tunnel will turn in either direction to a corresponding angular position in relation to the centre line of the sailboard. If the curvature of the sail is furthermore increased or decreased, a further turning of the tunnel is obtained and thereby an alteration of the direction in which the forward portion of the tunnel faces relative the longitudinal direction of the sailboard.

When the sail at the set curvature has been sheeted to an angle of attack relative the wind direction which gives optimum propulsion force, the forward portion of the tunnel will be facing substantially straight at the oncoming wind. The invention is based on the knowledge that this relationship can be utilized in a simple manner to obtain an easily visible indication of the current flow conditions with the aid of a wind vane. In accordance with the invention, the airflow direction indicator is provided with a fitting intended for attaching to the forward portion of the tunnel at a height such that the wind vane pivotably mounted thereon can easily be observed by the one sailing the sailboard. When the angle of attack of the sail gives optimum propulsion force, the vane will thus assume a substantially vertical position or position parallel with the mast while it swings to one side or the other when the sail has an attitude departing from the one giving the optimum angle of attack. The mounting shaft for the wind vane forms an acute angle to the longitudinal direction of the tunnel and the centre line of the mast, this angle suitably being in the region of 20° to 60°, preferably about 30°. The vane will then function as an airflow direction indicator with a sensitivity which is suitable from the practical point of view. In contrast to known wind indicators the airflow direction indicator according to the invention is substantially parallel with the mast when the indicator is in its neutral position.

A suitable embodiment of the airflow indicator in accordance with the invention is illustrated as an example on the appended drawings.

FIG. 1 schematically illustrates a sailboard with mast and a sail provided with an airflow direction indicator in accordance with the invention at its forward edge.

FIGS. 2, 3 and 4 are sections taken along the line II—II in FIG. 1 to show how the tunnel, forming the forward edge of the sail and slipped onto the mast, can turn relative the mast for different sail sheetings and for different settings of the sail curvature.

FIGS. 5, 6 and 7 show approximately the same section as in FIG. 3, with the sail set at different angles of attack in relation to the wind direction and with the inventive airflow direction indicator in different positions.

FIG. 8 is a view from the front of the forward edge of the sail tunnel, on which there is attached a fitting constituting the attachment for the inventive airflow direction indicator, the approximate width of the tunnel in its position on the mast being indicated by chain-dotted lines.

FIG. 9 is a side view of the fitting.

FIG. 10 is a view from above of the fitting on the forward portion of the tunnel, where the tunnel is shown slipped over the substantially cylindrical mast.

FIG. 11 is a view from the front of the wind vane incorporated in the airflow direction indicator in accordance with the invention and which is pivotably mounted on a shaft carried by a part removably attachable to the fitting in FIGS. 8 to 10.

FIG. 12 is a side view of the vane and the attachment part carrying the mounting shaft.

FIG. 13 is a section along the line 13—13 in FIG. 12.

FIG. 14 is a section along the line 14—14 in FIG. 12.

FIG. 15 is a section along the line 15—15 in FIG. 12. and

FIG. 16 is a schematic perspective view of the inventive airflow direction indicator mounted on the forward portion of a sail tunnel rotatable about the cylindrical mast, the vane being able to swing out on either side in response to the airflow direction or to find itself in the illustrated vertical, neutral position.

A sailboard 10 is schematically illustrated in FIG. 1 and has a substantially cylindrical mast 11 with a sail 12 the forward edge of which includes a tunnel 14 slipped onto the mast and rotatable in relation thereto as is illustrated in FIGS. 2, 3 and 4.

In accordance with the invention, a fitting 15 is attached to the forward portion of the tunnel, this fitting carrying a pivotably mounted wind vane 16, shown in more detail in FIGS. 11 to 15.

The sail 12 in FIG. 6 has a correct angle of attack relative the wind direction, for achieving maximum propulsion force on the vessel. In this position, the wind vane 16 assumes a neutral position, since the wind direction is substantially straight against the forward portion of the tunnel where the vane is placed.

If the sail angle is too great, which is shown in FIG. 5, or too low, which is shown in FIG. 7, a correspondingly angled wind flow is obtained at the forward portion of the sail, i.e. the forward portion of the tunnel, and this will be indicated by the vane 16 swinging out to one side or the other.

The vane 16 has the shape of a wing, as will be seen from FIG. 12, with a width decreasing towards the upper, free end of the vane. The vane is pivotably carried by an angularly upwardly directed shaft 17, in turn carried by a holder 18, removably attachable to a shield-shaped attachment plate 19 according to FIGS. 8 to 10. Together, the holder 18 and the plate 19 form the fitting 15 for carrying the vane 16.

The plate 19 has a concave backward face or a curved form, to fit the cylindrical surface of the mast, as will be seen from FIG. 10. On the forward side of the plate there are provided two relatively narrow guide rails 20,21 forming a slot to accommodate the holder 18, the bottom portion of which has a plate 22 with side edges adapted for guidance between the rails 20,21. The holder is locked in position with the aid of a latching means 23 snapping down behind the edge 24 of the plate 19.

As will be seen from FIGS. 8 to 10, the plate 19 is relatively thin with rounded edges on the rails 20,21, so that the sail can easily be wound round the mast and the plate 19 when the mast with the sail are to be transported or stored.

The plate 19 is provided with holes 25 at its corners, and sewing threads can be taken through these holes to sew the plate 19 into position on the forward portion of the tunnel, as illustrated in FIG. 16.

The angle A between the mounting axis 17 and the forward portion of the tunnel or the centre line of the mast, as well as the backward face of the holder 18, is in the region of 20° to 60°, preferably about 30°, as shown.

The major portion of the vane 16 is positioned above the shaft 17 and has a shorter and thicker portion 26 located below the shaft and containing a counterweight 27. The balance thereby obtained is such that the vane 16 is biased to return to its neutral, vertical position when the vane is unaffected.

What I claim is:

1. An airflow direction indicator for sailboards having a mast mounted to be tiltable in all directions relative to the sailboard and provided with a sail having its front edge formed to a tunnel which is slipped onto the mast and is turnable relative thereto to suit the sail curvature, characterized by a fitting supporting a wind vane rotatably mounted on a mounting shaft forming an acute angle with the main longitudinal direction of the fitting and tunnel, respectively, the fitting being adapted to be secured to the forward portion of the tunnel to follow the movements of the tunnel relative to the mast, and said wind vane having its main longitudinal direction provided substantially parallel with the longitudinal direction of the fitting and being biased to return to a substantially vertical, neutral position adjacent the fitting, whereby the vane will indicate changes in the direction of the flow of air around the forward edge of the sail, the angle of the mounting shaft to the longitudinal direction of the fitting and tunnel, respectively, being about 20° to 60°, the main portion of the wind vane being situated above the mounting shaft in the neutral position of the vane, the vane being counterbalanced to be biased to return to its neutral position, the wind vane having the shape of a wing with a substantially straight backward edge which is substantially parallel to the longitudinal direction of the fitting and tunnel, respectively, when the vane is in its neutral position.

2. An indicator as claimed in claim 1, characterized in that the fitting comprises two mutually separable, connectible parts, one part forming an attachment plate which is to be fastened to the forward portion of the tunnel, the other part forming a holder carrying the mounting shaft and the vane.

3. An indicator as claimed in claim 2, characterized in that the backward side of the attachment plate is concave to fit the substantially cylindrical surface of the mast.

4. An indicator as claimed in claim 1, characterized in that the fitting is provided with holes through which threads are to be passed for sewing it onto the fabric of the sail tunnel.

5. An indicator as claimed in claim 1, in combination with a said sail having a said tunnel, said indicator being secured to the tunnel on the side of the tunnel opposite the sail for movement with the tunnel relative to the mast.

* * * * *